United States Patent
Lavaque

(10) Patent No.: US 9,622,504 B2
(45) Date of Patent: Apr. 18, 2017

(54) VARIABLE PRESSURE DEVICE FOR SOLUBILIZING CARBON DIOXIDE IN A BEVERAGE

(75) Inventor: Oscar Lavaque, Boulogne (AR)

(73) Assignee: CYLZER S.A., Montevideo (UY)

( * ) Notice: Subject to any disclaimer, the term of this patent is extended or adjusted under 35 U.S.C. 154(b) by 388 days.

(21) Appl. No.: 13/567,391

(22) Filed: Aug. 6, 2012

(65) Prior Publication Data
US 2013/0037973 A1 Feb. 14, 2013

(30) Foreign Application Priority Data

Aug. 9, 2011 (AR) ................................ P110102885

(51) Int. Cl.
  *A23L 2/54* (2006.01)
  *B01F 5/04* (2006.01)
  (Continued)

(52) U.S. Cl.
  CPC ............ *A23L 2/54* (2013.01); *B01F 3/04751* (2013.01); *B01F 3/04808* (2013.01);
  (Continued)

(58) Field of Classification Search
  CPC ......... A23L 2/54; B67D 1/007; B67D 1/0073; B67D 1/0045; B01F 3/04808;
  (Continued)

(56) References Cited

U.S. PATENT DOCUMENTS

| 571,692 A | * | 11/1896 | Schneible | ............... F04F 5/461 417/182 |
| 1,611,321 A | * | 12/1926 | Schmidt | ............. B01F 3/04475 261/111 |

(Continued)

FOREIGN PATENT DOCUMENTS

| AR | 047011 | 8/2004 |
| AR | 239746 | 11/2004 |

(Continued)

OTHER PUBLICATIONS

Google translation of FR 2.191.547.*

(Continued)

*Primary Examiner* — Amber R Orlando
*Assistant Examiner* — Stephen Hobson
(74) *Attorney, Agent, or Firm* — Volpe and Koenig, P.C.

(57) ABSTRACT

A variable pressure device to solubilize carbon dioxide (CO2) in a beverage includes: a carbonation tank, a CO2 inlet valve and a venting valve attached to the tank's top part; a discharge valve attached to the tank's bottom part; a booster pump arranged immediately after the discharge valve; a recycling valve arranged immediately after the booster pump, which is connected to a recycling inlet at the top part of the tank; an outlet between the pump and the recycling valve; a level sensor arranged on the lid of the tank; a CO2 diversion valve attached to a tank side near its top part; a modulating valve arranged after the CO2 diversion valve; a Venturi attached immediately after the modulating valve; a control point arranged between the modulating valve and the Venturi; and a beverage inlet valve into the tank attached immediately after the Venturi, which is formed by a pipeline.

24 Claims, 5 Drawing Sheets

(51) Int. Cl.
  *B01F 5/10* (2006.01)
  *B01F 3/04* (2006.01)
  *B01F 5/00* (2006.01)
  *B01F 15/00* (2006.01)
  *B01F 15/02* (2006.01)

(52) U.S. Cl.
  CPC ........ *B01F 3/04815* (2013.01); *B01F 5/0057* (2013.01); *B01F 5/0428* (2013.01); *B01F 5/10* (2013.01); *B01F 15/00162* (2013.01); *B01F 15/00344* (2013.01); *B01F 15/0261* (2013.01); *A23V 2002/00* (2013.01)

(58) Field of Classification Search
  CPC ...... B01F 5/0428; B01F 5/10; B01F 3/04815; B01F 3/04751; B01F 15/00344; B01F 5/0057; B01F 15/00162; B01F 15/0261; A23V 2002/00
  USPC ........................................................ 261/127
  See application file for complete search history.

(56) References Cited

U.S. PATENT DOCUMENTS

| | | | | |
|---|---|---|---|---|
| 1,808,956 | A * | 6/1931 | Ketterer | B01F 3/04106 261/36.1 |
| 1,835,812 | A * | 12/1931 | Ridler | F24F 3/12 261/153 |
| 2,585,570 | A * | 2/1952 | Messinger | B64D 13/06 454/74 |
| 2,719,704 | A * | 10/1955 | Anderson | A47L 15/4427 137/599.03 |
| 2,965,362 | A * | 12/1960 | Flottmann | B01F 3/0807 236/1 E |
| 2,979,916 | A * | 4/1961 | Mason | B64D 13/06 236/92 R |
| 3,097,504 | A * | 7/1963 | Quick | B64D 13/06 62/241 |
| 3,256,802 | A * | 6/1966 | Karr | B01F 3/04262 222/146.1 |
| 3,370,755 | A * | 2/1968 | Querner | B01F 3/04808 222/146.1 |
| 3,394,847 | A * | 7/1968 | Garrard | B01F 3/04808 222/399 |
| 3,489,396 | A * | 1/1970 | Aragon | B01F 3/0446 210/170.06 |
| 3,510,252 | A * | 5/1970 | Reich | F24F 3/14 137/171 |
| 3,556,489 | A * | 1/1971 | Ueda | B01D 47/10 138/46 |
| 3,761,066 | A * | 9/1973 | Wheeler | B01F 5/0682 222/129 |
| 3,770,254 | A * | 11/1973 | Morrow | F24F 3/14 261/105 |
| 3,832,474 | A * | 8/1974 | Karr | B01F 3/04815 141/5 |
| 3,877,358 | A * | 4/1975 | Karr | B01F 3/04815 141/5 |
| 3,881,636 | A * | 5/1975 | D'Aubreby | B67D 1/0057 141/102 |
| 3,960,066 | A * | 6/1976 | LaRocco | A23L 2/54 426/590 |
| 3,960,175 | A * | 6/1976 | Liepe | B01F 5/0068 137/889 |
| 3,990,427 | A * | 11/1976 | Clinebell | F24F 6/12 126/113 |
| 4,019,983 | A * | 4/1977 | Mandt | B01F 5/0212 210/220 |
| 4,028,441 | A * | 6/1977 | Richards | B01F 3/04815 222/318 |
| 4,051,204 | A * | 9/1977 | Muller | B01F 3/04617 261/123 |
| 4,133,853 | A * | 1/1979 | Ore | B01F 3/04992 141/82 |
| 4,140,245 | A * | 2/1979 | Castillo | B67D 1/0009 137/386 |
| 4,211,735 | A * | 7/1980 | Berlin | F24F 6/14 126/113 |
| 4,235,719 | A * | 11/1980 | Pearson | C02F 3/1289 210/195.1 |
| 4,239,956 | A * | 12/1980 | Morton | F24F 6/18 126/113 |
| 4,308,138 | A * | 12/1981 | Woltman | B01F 3/0876 210/220 |
| 4,512,888 | A * | 4/1985 | Flynn | B03D 1/1418 209/168 |
| 4,562,014 | A * | 12/1985 | Johnson | B01D 35/06 261/64.1 |
| 4,564,375 | A * | 1/1986 | Munk | B05B 7/0483 239/589.1 |
| 4,636,337 | A * | 1/1987 | Gupta | A23L 2/54 141/311 R |
| 4,829,775 | A * | 5/1989 | Defrancesco | B64D 13/06 62/402 |
| 4,956,080 | A * | 9/1990 | Josefik | B01F 3/0446 210/109 |
| 5,054,688 | A * | 10/1991 | Grindley | B05B 7/005 169/15 |
| 5,062,548 | A * | 11/1991 | Hedderick | B67D 1/0004 137/170.1 |
| 5,391,328 | A * | 2/1995 | Ott | B01F 3/04099 261/36.1 |
| 5,402,967 | A * | 4/1995 | Hughes | B64D 13/06 169/62 |
| 5,524,848 | A * | 6/1996 | Ellsworth | B64D 13/00 244/118.5 |
| 5,598,837 | A * | 2/1997 | Sirianne, Jr. | A61M 16/16 128/203.12 |
| 5,622,655 | A * | 4/1997 | Cincotta | B01F 5/0413 261/76 |
| 5,681,507 | A * | 10/1997 | Kazuma | B01F 3/04475 261/119.1 |
| 5,842,497 | A * | 12/1998 | Drifka | B01F 5/0413 137/100 |
| 5,842,600 | A * | 12/1998 | Singleterry | A23L 2/54 222/1 |
| 5,851,445 | A * | 12/1998 | Kazuma | B01F 3/04475 261/103 |
| 5,873,256 | A * | 2/1999 | Denniston | B60H 1/00414 62/244 |
| 5,955,009 | A * | 9/1999 | Kazuma | B01F 3/04475 261/103 |
| 6,059,270 | A * | 5/2000 | Kurzer | A23L 2/54 261/29 |
| 6,092,794 | A * | 7/2000 | Reens | B01F 3/04049 261/115 |
| 6,099,404 | A * | 8/2000 | Hartenstein | B64D 13/00 126/113 |
| 6,105,942 | A * | 8/2000 | Kurzer | A23L 2/54 261/119.1 |
| 6,113,080 | A * | 9/2000 | Kazuma | B01F 3/04475 261/115 |
| 6,237,897 | B1* | 5/2001 | Marina | B01F 5/0413 137/855 |
| 6,270,059 | B1* | 8/2001 | Kurzer et al. | 261/29 |
| 6,364,625 | B1* | 4/2002 | Sertier | F04F 5/52 417/151 |
| 6,406,006 | B1* | 6/2002 | Dettling | A47F 3/001 261/115 |
| 6,734,405 | B2* | 5/2004 | Centanni | A61L 2/07 219/628 |
| 6,764,213 | B2* | 7/2004 | Shechter | B01F 3/0807 366/167.1 |
| 6,923,006 | B2* | 8/2005 | Walton | B67D 1/0009 222/146.6 |
| 6,990,964 | B2* | 1/2006 | Strohle | F23D 14/60 123/527 |

(56) References Cited

U.S. PATENT DOCUMENTS

| | | | | |
|---|---|---|---|---|
| 7,066,452 | B2* | 6/2006 | Rotering | F24F 6/025 261/142 |
| 7,188,488 | B2* | 3/2007 | Army, Jr. | B64D 13/08 62/401 |
| 7,354,029 | B1* | 4/2008 | Rutstein | B01F 3/12 239/DIG. 7 |
| 8,177,197 | B1* | 5/2012 | Ergican | B01F 3/0446 261/116 |
| 8,720,439 | B1* | 5/2014 | Kolkowski | A61M 16/16 128/203.12 |
| 8,939,129 | B2* | 1/2015 | Prinz | F02M 21/047 123/518 |
| 8,985,966 | B2* | 3/2015 | Sampson | B01F 3/02 261/76 |
| 2002/0134321 | A1* | 9/2002 | Alix | B64D 13/00 122/21 |
| 2003/0177784 | A1* | 9/2003 | Walton | B67D 1/0009 62/600 |
| 2005/0051577 | A1* | 3/2005 | Loeb | B01F 5/0077 222/145.6 |
| 2005/0089408 | A1* | 4/2005 | Solomon | B01F 5/0413 417/182 |
| 2005/0127540 | A1* | 6/2005 | Han | F22B 1/284 261/119.1 |
| 2008/0135646 | A1* | 6/2008 | Wilkinson | B01F 5/0415 239/432 |
| 2008/0187794 | A1* | 8/2008 | Weingaertner | B01F 5/0415 429/414 |
| 2009/0130278 | A1* | 5/2009 | Murota | A23F 3/163 426/474 |
| 2009/0189018 | A1* | 7/2009 | Dittmar | B64C 1/066 244/121 |
| 2009/0321544 | A1* | 12/2009 | Akisada | B60H 3/0078 239/704 |
| 2010/0043794 | A1* | 2/2010 | Saito | B64D 11/06 128/204.22 |
| 2013/0240355 | A1* | 9/2013 | Ho | B01D 63/10 204/451 |
| 2014/0102422 | A1* | 4/2014 | Prinz | F02M 21/047 123/527 |
| 2014/0145012 | A1* | 5/2014 | Ritchie | F24F 5/0035 239/424 |
| 2014/0286122 | A1* | 9/2014 | Livshits | B01F 5/0057 366/165.1 |
| 2015/0343399 | A1* | 12/2015 | Kim | C10L 1/125 435/408 |
| 2016/0325245 | A1* | 11/2016 | Delerue | B01F 5/0413 |

FOREIGN PATENT DOCUMENTS

| | | | | |
|---|---|---|---|---|
| DE | FR 2123429 | A3 * | 9/1972 | B01F 5/0415 |
| DE | 4137573 | A1 * | 5/1993 | B01F 5/0415 |
| DE | EP 0602387 | A1 * | 6/1994 | B01F 3/04815 |
| DE | 29705398 | U1 * | 5/1997 | B60H 1/3229 |
| DE | FR 2857274 | A1 * | 1/2005 | B01D 45/16 |
| EP | 0602387 | | * 11/1993 | |
| FR | 2191547 | | * 6/1972 | |
| FR | 2191547 | A5 * | 2/1974 | B67D 1/0057 |
| GB | 1314832 | A | 4/1973 | |
| GB | 1600802 | A * | 10/1981 | F02M 9/133 |
| GB | 2370561 | A * | 7/2002 | B67D 1/0009 |
| GB | WO 02051739 | A2 * | 7/2002 | B67D 1/0009 |
| GB | WO 02051739 | A3 * | 10/2002 | B67D 1/0009 |
| GB | 2377427 | A * | 1/2003 | B67D 1/0009 |
| GB | 2514202 | A | 11/2014 | |
| GB | WO 2014184585 | A2 * | 11/2014 | C02F 1/74 |
| JP | EP 0745425 | A1 * | 12/1996 | B01F 3/04475 |
| JP | EP 1090677 | A1 * | 4/2001 | B01F 3/04475 |
| LI | WO 9307960 | A1 * | 4/1993 | B01F 5/0415 |
| WO | 0103817 | A1 | 1/2001 | |

OTHER PUBLICATIONS

Google translation of EP 0 302 387.*
"Capacitance Level Measurement" published May 12, 2003 online at <https://web.archive.org/web/20030512055019/http://www.omega.com/Green/pdf/CAP_LEV_MEAS.pdf> (hereafter Capacitance).*
Google translation of Brosseau et al. FR 2.191.547 published Jun. 1972.*
Google translation of Manfred EP 0 602 387 A1 published Nov. 1993.*
Transcat Rosemount 2110 Product Data Sheet published Feb. 2008.*
"Capacitance Level Measurement" published May 12, 2003 online at <https://web.archive.org/web/20030512055019/http://www.omega.com/Green/pdf/CAP_LEV_MEAS.pdf>.*
"3M Retention Valve" published 2007.*

* cited by examiner

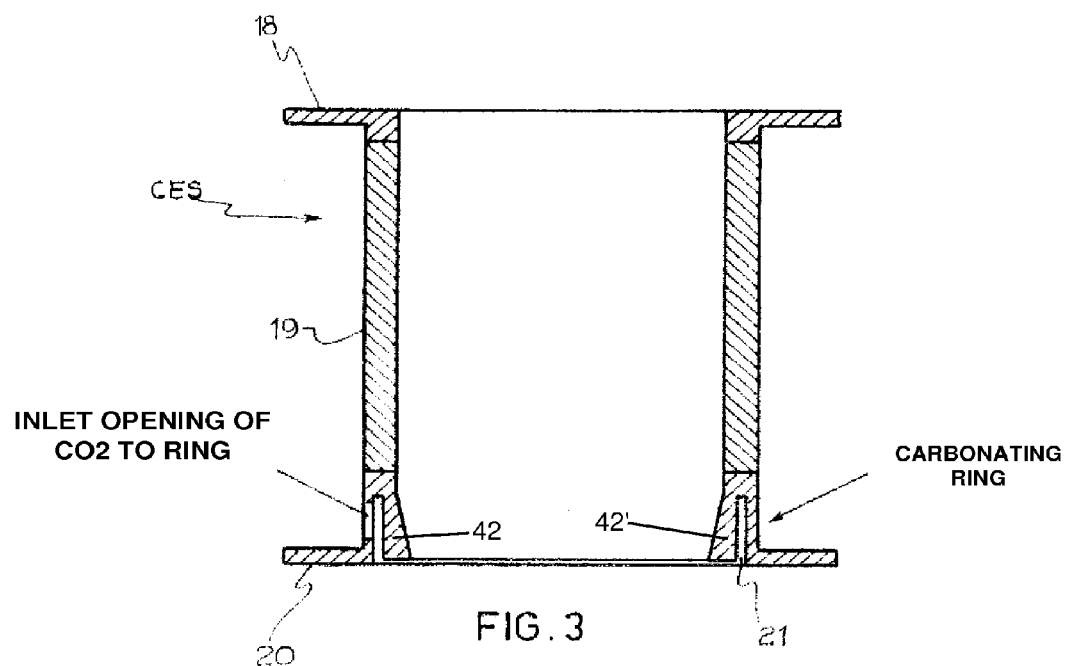
FIG. 3
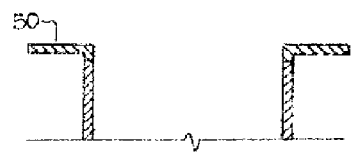
FIG. 4B
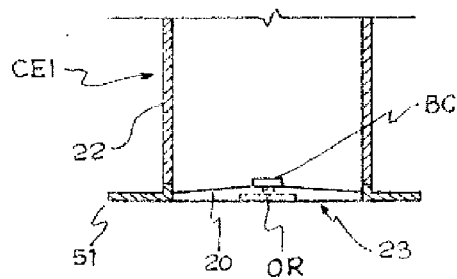
FIG. 4A
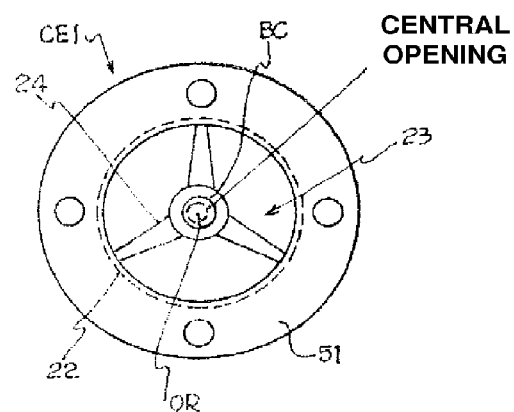

VARIABLE PRESSURE DEVICE FOR SOLUBILIZING CARBON DIOXIDE IN A BEVERAGE

CROSS REFERENCE TO RELATED APPLICATIONS

The present application claims benefit under 35 U.S.C. 119 to Argentine patent application No. P110102885, dated Aug. 9, 2011, the entire contents of which are incorporated by reference as if fully set forth.

FIELD OF THE INVENTION

The present invention relates to a variable pressure equipment to solubilze carbon dioxide ($CO_2$) in a beverage. More specifically, the present invention relates to a device that provides gas solubility in a beverage without controlling the pressure of the carbonation tank, and maintaining a constant carbon dioxide volume during the whole process of beverage production.

BACKGROUND

WO01/03817 A1 discloses a carbonating device that provides carbon dioxide under pressure into a beverage, wherein the feeding tip comprises a variable Venturi hole where said carbon dioxide under pressure contacts the beverage, the Venturi variation being adjustable.

U.S. Pat. No. 3,256,802 discloses a continuous carbonation system, where stopping carbonated beverage or beverage to be carbonated immediately stops carbon dioxide intake so as to avoid over-carbonation. The carbonated beverage is previously stabilized before reaching the bottling station, as undesired gas traces within the carbon dioxide are ineffective to produce foam in the filling heads. Carbon dioxide enters the beverage under pressure by means of a Venturi.

U.S. Pat. No. 5,842,600 discloses a carbonation apparatus and process, wherein carbonated water is prepared by a process combining respective water and carbon dioxide flow streams in a mixing Venturi. Downstream from Venturi, the water and carbon dioxide mixture goes through a static mixer prior to the dispenser discharge.

GB1314832 discloses a system for controlling a beverage flow, which automatically regulates flow rate of a carbonated beverage from a supply source towards a receptacle or tank, according to a low or high beverage level inside the tank.

AR239746 describes an apparatus to carbonate or enrich with carbonic acid a predetermined amount of beverage, comprising a venting means attached to the headspace, said venting means having a duct provided between the headspace and the environment, and a gas-permeable plate provided in the duct aimed at limiting the rate of flow through the duct, so as to be able to continuously purge gas from the headspace while maintaining a predetermined pressure.

In general, the above documents are "in situ" carbonated beverage dispensers, or regulators of the carbon dioxide amount in a beverage to be carbonated, such as water or a syrup in particular. Furthermore, some of them "vent out" carbonic gas to the environment during the process of carbonated beverage production.

None of the above-mentioned devices has the two principles included in the device of the present invention. On one hand, the present invention uses the Venturi principle to achieve gas solubility in the beverage (Venturis used in prior art documents are not used for this purpose), and on the other, carbonation tank pressure control for maintaining a constant carbon dioxide volume during beverage production is unnecessary. Besides in order to reach high carbon dioxide volumes, conventional shower systems and high pressure pumps should generate an elevated pressure in the mixture, and in several contact stages, whereby the beverage becomes so agitated that renders packaging very difficult.

SUMMARY

Thus, it is an object of the present application to provide a variable pressure device to solubilize carbon dioxide in a beverage, including:
  a carbonation tank;
  a carbon dioxide inlet valve and a venting valve, both of them being attached to the top part of said tank;
  a discharge valve attached to the bottom part of said tank;
  a booster pump arranged immediately after said discharge valve;
  a recycling valve arranged immediately after said booster pump, which in turn is connected to a recycling inlet at the top part of said tank;
  an outlet to a filling equipment arranged between said pump and said recycling valve;
  a level sensor L arranged on the lid of said tank;
  a carbon dioxide diversion valve attached to a side of the tank, adjacent to the top part thereof;
  a modulating valve arranged after said carbon dioxide diversion valve;
  a Venturi arranged after said modulating valve;
  a control point arranged between said modulating valve and said Venturi; and
  an inlet valve to feed the beverage into the tank immediately after said Venturi, the device comprising a pipeline consisting of:
  an upper outer body;
  a lower outer body linked to said upper outer body, both forming a pipeline;
  a bullet arranged in the interior of said pipeline; and
  a vortex throttle assembly arranged at an end of said bullet, and formed by at least two vortex elements facing each other and on both sides of said outer body walls.

BRIEF DESCRIPTION OF THE DRAWINGS

To better understand the concepts of this invention and for the sake of clarity, the invention core has been illustrated according to its preferred embodiments, all of which being merely exemplary in nature:

FIG. 3 illustrates the Venturi upper outer body laterally;

FIG. 4A is a side view of the Venturi lower outer body, and FIG. 4B is a bottom view thereof with its fixing star;

DETAILED DESCRIPTION OF THE PREFERRED EMBODIMENTS

Introduction to the Embodiments

The device of the invention is intended to overcome the above-mentioned disadvantages and features the following advantages:

The Venturi of the present invention device losses only 10-20% of pressure difference between the inlet and the throat thereof, whereby the beverage undergoes no agitation, which is significantly advantageous for carbonated beverage packaging purposes and to enhance gas dissolution.

No further homogenizing process is required after carbonation, which means effectiveness and efficacy of the process.

Carbonation through the Venturi of the present invention device allows optimal carbon dioxide dissolution in the beverage, thus minimizing said gas consumption.

Impact generated on the kinetic energy of the beverage-soluble gas is very low, thus minimizing foaming upon packaging.

Low level of carbon dioxide release from the beverage.

No flowmeters are required to control the gas flow rate during the carbonation process, thus maintaining carbonation effectiveness.

The tank has no internal rings, or plates, or other types of equipment used in conventional carbonation systems.

Only one tank is needed to reach gas solubility.

There is no gas venting as the system retrieves the gas not retained in the beverage, using it again for the carbonation process. This means a lower environmental impact.

The Venturi of the present invention device takes advantage of the speed at which the beverage enters into the tank in order to generate the necessary vacuum to carbonate the beverage, and so gas pressures at the inlet can be relatively low.

Upon carbonation bypassing, it is possible to recycle beverage to increase or reduce the gas volume.

Volume of carbon dioxide is kept stable by increasing the temperature.

DETAILED DESCRIPTION

Figure 1:
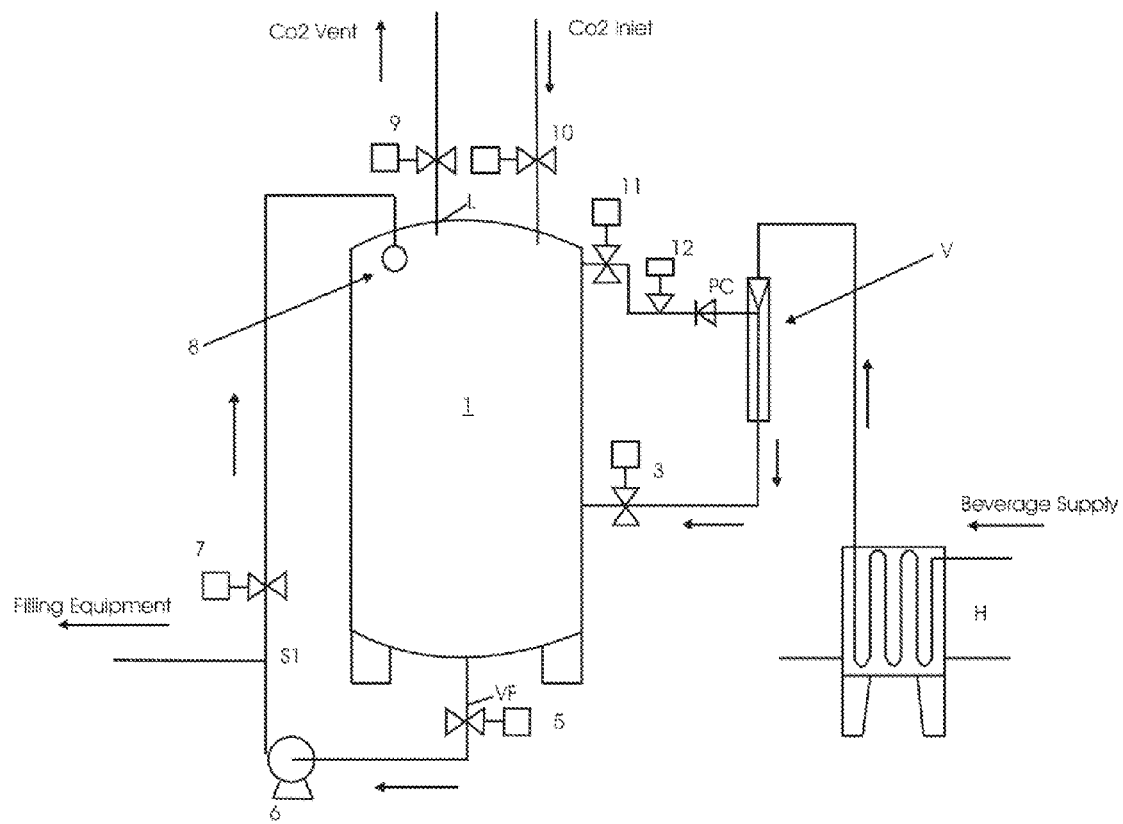
FIG. 1 illustrates a layout of the invention carbonating device.

In FIG. 1 a layout of the invention device is illustrated, comprising a beverage carbonation tank 1, said beverage being water or a particular syrup. Said tank 1 is made from an AISI 304 stainless steel sheet, preferably 5 mm thick. This sheet should be rolled to a cylinder 900 mm in diameter, and joined using an inert welding on its outer and inner face. Once the cylinder has been formed, the caps are welded, one top and another bottom, in its top and bottom part, respectively. The top cap will have an inspection opening provided with a 350 mm diameter flange, on which a 1" pipe is welded for venting purposes, said pipe being associated with a venting valve 9, a 1" pipe for carbon dioxide inlet, which is associated to a carbon dioxide inlet valve 10, a flange for a safety valve, a 1" pipe communicating a recycling valve 7 having a recycling inlet 8 to the tank 1, and a collar for a pressure transducer (not shown). In the above-mentioned inspection opening a collar including a level sensor, preferably of the capacitive type, is placed. The bottom cap has only a discharge pipe associated with a discharge valve 5, for beverage discharging from the tank 1. Immediately after said discharging valve 5, a booster pump 6 is connected, which drives beverage up towards the tank top part 1, or by means of an outlet S1, to filling equipment (not shown), depending on whether said recycling valve 7 is opened or closed. Said outlet S1 is located between said pump 6 and said recycling valve 7. The tank 1 is designed and built to withstand maximum pressures up to 8 Kg/cm2. The tank is externally polished, and 3 4" pipe legs are attached thereto with a flat plate in its bottom part. A 1" collar is attached to the discharge pipe in order to install a vibrating fork (not shown). At the side of the tank 1, some 200 mm away from its top part, a flange for a pipe carrying carbon dioxide to a Venturi V is placed. Said pipe is associated with a carbon dioxide inlet diversion valve 11 to the Venturi V, and subsequently to a modulating valve 12, and it includes a control point (PC) between said modulating valve 12 and the inlet into said Venturi V. Said modulating valve 12 is a retention valve. Further, the beverage entry into the tank 1 is effected by means of a beverage inlet valve 3 arranged immediately after said Venturi V. Prior to its passing through the Venturi, the beverage passes through the heat exchanger H, where it mixes up with glycol. Said tank 1 is subjected to a carbon dioxide pressure, which will vary as the volume in tank 1 varies due to the beverage supply therein. In order to carbonate the beverage, said Venturi V will take gas (i.e., carbon dioxide) from the top part of tank 1, its flow rate being controlled by said modulating valve 12. The carbonation inside the Venturi V is produced by the action of two principles, already mentioned, the Venturi effect and the vortex effect. Unlike conventional systems where the pipeline section forming a Venturi is reduced like a bottleneck, in the present invention the pipeline section forming the Venturi is reduced even further due to the insertion of a stainless steel bullet B therein, thus maximizing the contact surface between gas and beverage.

Figure 2A:
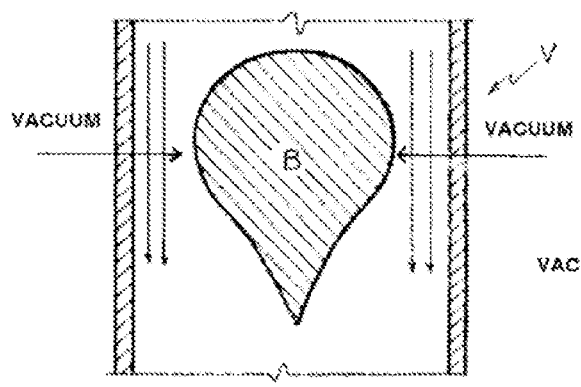
FIGS. 2A and 2B illustrate a side view of a pipeline forming the invention Venturi, wherein the reduction in section generated by the Venturi effect due to the presence of the bullet, and the vortex effect due to the presence of vortex throttle assembly, are respectively observed.
Figure 2B:
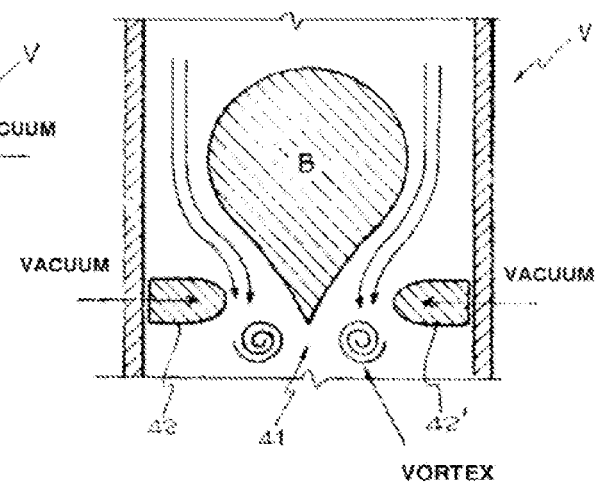

FIG. 2A illustrates a pipeline forming the Venturi of the present invention. Said pipeline is entirely manufactured of AISI 304 stainless steel, and consists of an upper outer body [CES] and a lower outer body [CEI] assembled together (see FIGS. 3, 4 and 6), and a bullet B arranged inside said upper and lower outer bodies (CES, CEI), its purpose being that of creating a section reduction in the pipeline so as to reduce fluid pressure, thus creating the Venturi V principle. While low pressure in the section reduction area of the above mentioned pipeline promotes incorporation of carbon dioxide and solubility thereof in the beverage, in order to further increase and ensure gas homogenization, a vortex throttle assembly 41 is incorporated, generated by at least two vortex elements (42, 42') arranged facing each other, and on both sides of, the walls of said Venturi V, to generate a vortex effect, as illustrated in FIG. 2B. This vortex effect leads to beverage turbulence upon exiting from the section reduction.

The upper outer body (CES) is comprised of three pieces, as illustrated in FIG. 3. On one side, a first upper flange 18 of OD 127 mm, under DIN 65 standard; a central body 19 formed by a nominal 2½" pipe, welded on one end to said first upper flange 18 and on the other, to a carbonating ring 20. Said carbonating ring 20 is manufactured with AISI 304 stainless steel, wherein a groove 21 is laterally machined, and through which carbon dioxide is to enter. In turn it will have an 18 mm inlet, and by fixing means, such as screws, said CES is secured to a carbon dioxide inlet pipeline, and to said lower outer body (CEI). In the carbon dioxide inlet pipeline, the modulating valve 12 is disposed.

The lower outer body (CEI) comprises the following pieces, all of them manufactured with AISI 304 stainless steel, as illustrated in FIG. 4A. At the respective ends of said lower outer body (CEI) a second upper flange 50 which links said upper outer body (CES) and a lower flange 51 of OD 127 mm DIN 65, both welded to a 2" ½ nominal pipe forming the primary body, are arranged. As illustrated in FIG. 4B, at the lower part of said lower outer body (CEI), a fixing star 23, which can be appreciated in its top view, is arranged. This fixing star 23 is built from a AISI 304 stainless steel sheet, from which the star itself is milled. There is a threaded opening [OR] in its center and a centering pillow [BC]. Care should be taken that the star center 23 is concentric to the pipe wall because the star arms 24 are welded to the pipe internal part. Said upper outer body (CES) and said lower outer body (CEI) are substantially identical to achieve beverage flow continuity.

Figure 5:
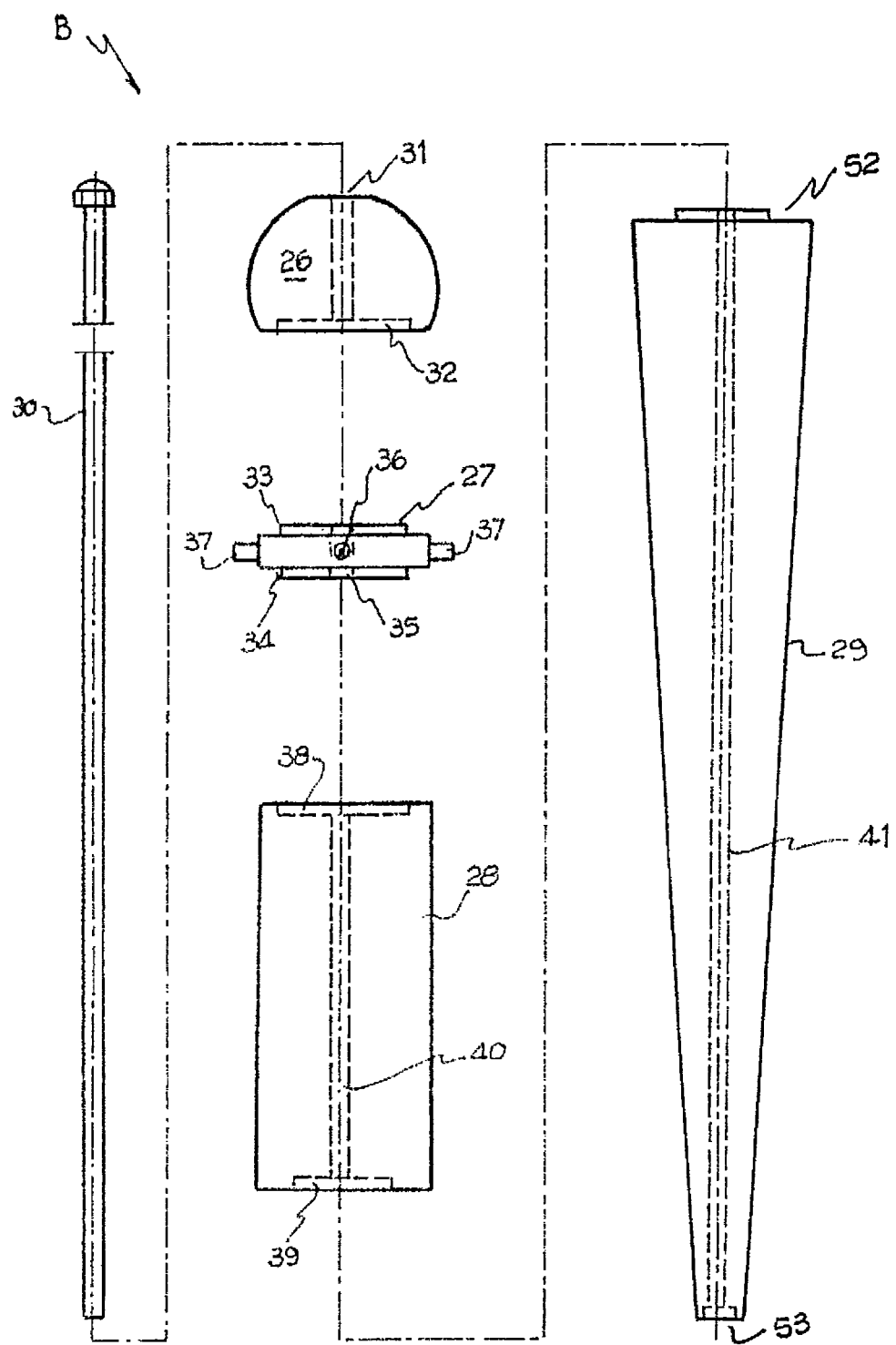
FIG. 5 illustrates an exploded view of the bullet inserted into the upper and lower outer bodies of FIGS. 3 and 4, once assembled.

Finally, and as illustrated in FIG. 5, a bullet B made of AISI 304 stainless steel comprises the following elements: a head 26, an upper centering ring 27, a central body 28, a reduction cone 29, and a coupling rod 30. The head 26 is made of a stainless steel solid bar, which has a dome shaped form. In its center, it has a through hole 31 which crosses it lengthways, so that said coupling rod 30 can pass therethrough. At its bottom part it has an overhand rebate 32 which allows to abut into said upper centering ring 27. Said upper centering ring 27 is built from a stainless steel solid bar, wherein there are machined a ring upper recessing 33, a ring lower recessing 34 and a second through hole 35 which crosses it lengthways, so that said coupling rod 30 can also pass therethrough. In its periphery at least four holes 36 are drilled, distributed at 90°, where at least four stainless steel nipples 37 are nailed (see FIG. 6). These at least four nipples 37 allow fixation of said bullet B to said pipeline, adjacent to the linking of said upper outer body (CES) with said lower outer body (CEI). Said central body 28 of cylindrical shape, is made of a stainless steel solid round bar, which is subjected to central body recessing 38, 39 in the upper and lower portion respectively, in order to allow the abutment with said upper centering ring 27 and with said reduction cone 29. It also includes a third through hole 40 which crosses it lengthways for said coupling rod 30 to pass therethrough. Said reduction cone 29 is made of a stainless steel solid round bar, which is lathed to form the cone, a cone upper rebate 52 in order to link with said central body 28, a cone lower rebate 53 to link with the centering pillow (BC) of said fixing star 23 of said lower outer body (CEI). Also, like to the rest of the pieces, a fourth through hole 41 is drilled on said reduction cone 29 that crosses it lengthways so that said coupling rod 30 can passing therethrough. Said head 26, said upper centering ring 27 and said central body 28 internal diameters are substantially equal. Said head 26, said upper centering ring 27 and said central body 28 external diameters must be defined in order to reduce said pipeline section to generate the Venturi effect, allowing the passing of beverage stream lines. Said internal diameter of the reduction cone 29 varies from an internal diameter substantially equal to said central body 28 internal diameter until it reaches a supplementary internal diameter to that of said centering pillow (BC). The coupling rod 30 has a supplementary thread to that of said threaded opening (OR) so as to fix, such as in the case of nipples 37, the bullet B to the pipeline.

Figure 6:
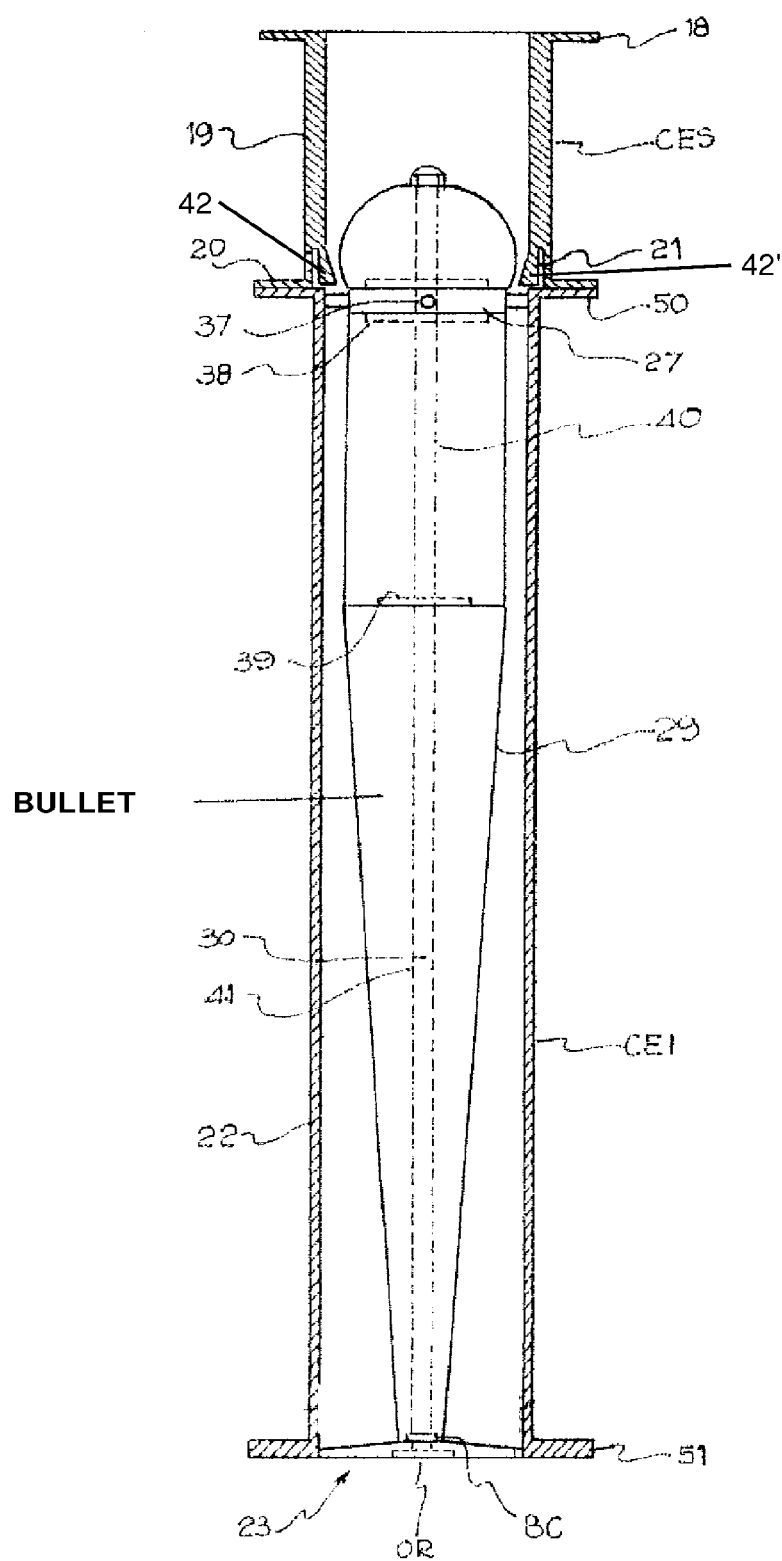
FIG. 6 illustrates final assembly of the present invention device Venturi.

In FIG. 6, the completely assembled set forming the invention Venturi can be observed, where the vortex throttle assembly 41 arranged at an end of said bullet B, and formed by at least two vortex elements 42, 42' arranged facing each other and on both sides of said outer body walls (CES) can also be observed. The profile and precise location of said at least two vortex elements 42, 42' depend on the desired beverage flow turbulence.

How the Device of the Invention Works

In order to ensure a stable carbonation in a beverage continuous manufacture process three variables should be controlled.

Fluid temperature.
Fluid flow rate.
Venturi inlet gas flow rate.
Venturi reduction (section difference).

The fluid temperature can be controlled by means of a heat exchange system (plate or tube heat exchanger) whether ammonia/water or ammonia/glycol/water. In FIG. 1, a plate heat exchanger upon beverage entry into the carbonation tank 1 is illustrated. The temperature control has no relevance in particular for the design of the invention the, as any temperature control system, according to the flow rate being carbonated, can be used. The ideal beverage temperature to enhance device performance is 4° C. at Venturi inlet. If the beverage temperature increases during the carbonation process, the device will increase the carbon dioxide modulating valve 12 opening. The opening percentage in terms of temperature increase and other details will be explained below. The beverage flow rate at the tank 1 inlet should be constant because the Venturi section V is calculated based on the beverage flow rate that is being packaged, and thus the Venturi section V is fixed. In case of minor beverage flow rate variations at the Venturi inlet V, vacuum thereof will be reduced or increased. This vacuum variation will allow a small offset, as higher or lower carbon dioxide flow rate will enter the Venturi V. Now, if the flow rate is substantially decreased, beverage at the Venturi V would not achieve a turbulent pattern, and thus, no vacuum would exist at the carbon dioxide inlet 10, and this would result in a practically non-carbonated beverage. The gas flow rate at the Venturi inlet V is controlled by modulation of the modulating valve 12, and its logic is detailed below. In summary, we can say that with the modulating valve 12 opening of the Venturi inlet V, we control the volume of carbon dioxide during the process and we offset the temperature or pressure variations on tank 1.

The equipment has a programmable logic controller (PLC), which is in the main board, where different operation options thereof can be accessed. Said programmable logic controller (PLC) is attached to a control point (PC) arranged between said modulating valve 12 and said Venturi inlet V. In the main menu, we could see a working screen list, and among them:

Cooling
Manufacturing
Sanitization
Manual
Settings
Alarms
Calibration screen

We should scroll up and down these options using the arrows in order to access each of them and place the cursor in the desired option/menu. Once positioned, it will be enough to press the largest key on the keyboard, i.e. ENTER.

Carbonated Beverage Production Startup

The startup operation has three stages: first cooling, second production startup per se, and third and last pouring.

First Stage: COOLING
  a) This step has the purpose of cooling the line (Carbonation tank 1 and Filling Equipment) and removing the air trapped inside the carbonation tank 1. The following procedure should be followed in order to carry out with this step:
  b) The cooling equipment should be operative and at working temperature;

c) The beverage manufacturing equipment should be ready for feeding the beverage to the carbonation tank 1; and d) Access the Manufacturing menu and load the flavor to be packaged.

Under the conditions above, access the Cooling menu and start this operation.

Description of Cooling Process Within Carbonation Tank:

Once the cooling process has been started, the discharging valve 5 is closed, and beverage inlet valves to the tank 3 and the venting valve 9 are opened.

It is expected that when the tank level 1 reaches 100%, a pressure of 2 kg/cm$^2$ is reached, thus ensuring the complete filling of tank 1. At this time a signal to stop the beverage feeding is emitted, followed by the closing of beverage inlet valve 3 into the tank 1, the venting valve 9, and finally, the carbon dioxide inlet valve 10 are opened, thus beginning then the tank pressurization 1 with carbon dioxide at 2 Kg/cm$^2$.

Once the tank 1 has been pressurized, the discharging valve 5 is enabled, thus beginning the tank 1 pouring. When the level is zero (that is, when the vibrating fork VF flags vacuum) 50 seconds venting carbon dioxide through the filling equipment should be waited, and the discharging valve 5 is closed, remaining the device in stop status.

Gas scavenging aims at removing the beverage remaining from the pipelines, as a result from cooling.

Second Stage. Beginning of Carbonation:

Access the Manufacturing menu and once accessed, start production.

Upon beginning of production process, the carbon dioxide inlet valve 10 is opened, allowing its feeding into the tank 1.

The equipment has two setting pressures, a first one for levels 0 to 30%, and a second for levels 30 to 90%.

When the tank pressure 1 reaches the first setting pressure (charge pressure up to 30% level), the beverage manufacturing equipment will receive a signal for beverage feeding into the tank 1.

The tank 1 pressure is measured by means of a pressure transducer, located at the tank 1 head. This pressure could be displayed on the board programmable logic controller (PLC).

When the beverage manufacturing equipment starts delivering the beverage, the carbonating device opens the beverage inlet valve 3 into the tank 1, then the carbon dioxide diversion valve 11 into the Venturi V, and finally the modulating valve 12 is set to a 80% opening, to allow flow rate control in the Venturi V.

While beverage is passing through the heat exchanger H, said beverage reduces its temperature, having to reach the working temperature, some 4° C.

As the beverage is fed to tank 1 the carbon dioxide will solubilize through Venturi V. The beverage being fed to the tank 1 will increase the pressure therein. The modulating valve 12 will begin to close so as to prevent this pressure increasing from affecting the carbon dioxide flow rate in the Venturi V. The modulating valve 12 closing percentage complies with a formula developed according to carbon dioxide variations to different pressures and different closing percentages, for the purpose of maintaining a constant flow rate.

As mentioned above, the concept of pressure control in tank 1 is different from that of conventional systems, as in this case pressure may freely vary. This is possible because the system sets a minimum pressure, and then maintains the flow rate, compensating the pressure increase, reducing the pipe section of an inlet pipe into the Venturi V, thanks to the modulation of the modulating valve 12.

When the load reaches 30%, the device switches automatically to the second setting pressure. This second pressure will be the device process pressure, which can be modified from the board programmable logic controller (PLC).

When the device begins to solubilize the carbon dioxide, the pressure in tank 1 might drop. In order to offset this drop, the carbon dioxide inlet valve 10 opens again, thus compensating minimum pressure in tank 1, hence also the flow rate in Venturi V. This is important because if pressure increases, the modulating valve 12 offsets this variation. On the contrary, if pressure decreases, tank 1 pressure should be increased to prevent flow rate from dropping in the Venturi V.

If while the beverage is loaded into the carbonating device the beverage temperature increases, the carbon dioxide solubility decreases. This principle is based on Henry's law which establishes that a gas solubility in a beverage increases as its temperature decreases.

In order to offset the beverage increased temperature without affecting the carbon dioxide volume, the modulating valve 12 may be opened up to 100%, as its normal working position is 80%, as previously explained.

This means that under optimal working conditions (working flow rate, temperature of 4° C., and setting pressure) the modulating valve 12 will be opened at 80%. If pressure varies exceeding the setting pressure, the modulating valve 12 is closed, whereas if temperature increases exceeding 4° C., the modulating valve 12 increases its opening between 80 and 100%.

Once charging has been completed (maximum predetermined level) a signal is emitted to the beverage manufacturing equipment to stop the feeding thereof.

As soon as the beverage feeding is stopped, the beverage inlet valve 3 into the tank 1 is closed and immediately thereafter, also the carbon dioxide diversion valve 11 into the Venturi V is closed too.

Once the load has been completed, it will be possible to analyze the beverage so as to make sure it is in full compliance with the desired parameters.

While customizing the loading levels in the carbonating device will be possible, in order to provide an homogeneous beverage load, working levels (beverage request and cut) should be above 50% of tank 1, as the beverage inlet pipe is at a 30% level. Also, it should be considered that loads should be greater than 20%. This means that if the request is set at the 50% level, the cut should be higher than 70% and lower than 90%.

In case an alarm is set during the loading process, the device shall display a sign identifying the reason thereof. Alarms may be indicative of:

a) Carbon dioxide low pressure b) Compressed air low pressure c) Some of the valves did not open or close d) The beverage manufacturing equipment is under some non-operating condition e) The filling equipment is not working f) Carbon dioxide low level g) Low level of saccharose dissolved in water (Brix) Brix is used to measure sugar concentration in the beverage. For sugar-sweetened beverages, Brix degrees (° Bx) measure the total quotient of saccharose dissolved in a liquid. A solution of 25° Bx has 25 g of sugar (saccharose) per 100 g of liquid or, in other words, there is 25 g of saccharose and 75 g of water in 100 g of solution.

° Bx are measured with a saccharometer, which measures the specific gravity of a liquid or, more easily, with a refractometer.

h) Access the Alarm menu from the main menu, and reset (to zero) any alarm which might have been displayed.

i) If the alarm concerns a valve, check its status and operation.

j) When carbon dioxide and Brix are within predetermined parameters, an OK confirmation is sent in order to enable the discharging valve 5. For that purpose, Manufacturing menu should be accessed, and the OK key should be pressed.

k) If carbon dioxide volume was out of specification (this is valid for those devices with an online carbon dioxide meter installed) it will be necessary to recycle the beverage. Recycling consists of feeding the beverage from the discharging tank 1, i.e. from the discharging valve 5, through the recycling valve 7 pipe towards the recycling inlet 8 into the tank 1. Once the beverage accesses the tank 1 in a shower fashion, the re-carbonation or de-carbonation thereof is allowed, the latter in case of pressure decrease in tank 1.

In order to have the beverage recycle, the menu should be accessed manually, and from manufacturing menu press "beverage retrieve". Recycling time will depend on the beverage carbon dioxide level and the desired carbon dioxide volume. Upon recycling, the device prompts the user to enter the volume to be increased, and based on this it calculates the recycling time and waits to stabilize the beverage. These times were collected in a practical way, based on these times between recycling time and beverage carbon dioxide volume increase, proportionality is calculated.

During the run, it may become necessary to increase or reduce pressure in carbonation tank 1 according to carbon dioxide volume. In case of a low volume, pressure should be increased, and in case of a high volume, pressure should be reduced; for that it will be necessary to enter from manufacturing screen the new pressure value for tank 1. It is important that changes in tank 1 pressure are progressive (0.10 Kg/cm$^2$), as a dramatic change could generate a carbon dioxide volume steep or drop in the package to be filled.

Third Stage: Carbonation tank Pouring

When the carbonation tank 1 beverage load is completed, tank 1 will continue delivering beverage to the filling equipment until a 30% level is reached. At this point, discharging valve 5 is closed and a low level of beverage is displayed on the operation screen.

The PLC will cut feeding process when reaching 30%, as below this level beverage inlet pipe to it will be uncovered. If the product inlet pipe is exposed to gas contained therein, beverage entering in it will impact on the gas chamber and over-carbonate. For this reason there are two pressures, a first one until 30% of level, and a second from 30% and above. The first setting pressure is almost 1 Kg/cm$^2$ less than the second setting or working pressure.

Recognizing the alarm by pressing the device, and having it drain. At this point, the device will remain in a Draining status (which allows the final consumption of beverage contained in tank 1 to be made). At this point only the discharging valve 5 will be opened. The rest of the valves will be closed, driving the rest of the beverage by using the pressure remaining in tank 1.

Once the whole packaging has been finished, stop the device by pressing Stop. At this point the device is in STOPPED status with all of its valves closed.

Fourth Stage: Carbonation Tank Sanitization a) With the carbonating device in STOPPED status, access the Sanitization menu from the main menu.

b) Once accessed, press F2 to start this operation.

When PLC is started, the equipment will:

a) Open the discharging valve 5 of tank 1.

b) Open the modulating valve 12 at 100%.

c) Open carbon dioxide inlet diversion valve 11 to the Venturi V.

d) Open the recycling valve 7.

e) The venting valve 9 will work intermittently.

f) The booster pump 6 continues working at maximum speed.

Manual Operation of the Equipment:

In addition automatic production processes described above, the device of the invention has a manual operation screen for pumps and valves comprise therein. This menu may be useful in case of failure, or to check functioning of any particular valve or pump.

The invention claimed is:

1. A variable pressure device to solubilize carbon dioxide in a beverage, comprising:

a carbonation tank having a top part and a bottom part, the top part being fed with carbon dioxide;

a Venturi placed to communicate with said top part of the tank and with the bottom part of the tank;

the Venturi being fed with the carbon dioxide from said top part of the tank and with the beverage from a beverage supply, such that the carbon dioxide is solubilized in the beverage and is fed to said bottom part of the carbonation tank, the device further comprising, a modulating valve configured to control a flow rate of the carbon dioxide that is added in the Venturi, wherein said flow rate control of carbon dioxide that is added in the Venturi offsets pressure variations inside the carbonation tank and offsets temperature variations of the beverage that is added in the Venturi, wherein said Venturi comprises an upper outer body linked in relation to a lower outer body, said upper and lower outer bodies forming a pipeline, which defines an area, wherein said Venturi's upper outer body further comprises a carbonation ring in which is laterally machined a groove through which carbon dioxide laterally enters into the Venturi, wherein the Venturi further comprises a bullet disposed inside said upper outer body and inside said lower outer body, the bullet comprising a head, an upper centering ring, a central body and a reduction cone, wherein structural configuration of the head and of the upper outer body establish the smallest area of the Venturi, and the area established between the lower outer body and the bullet is kept constant from a connection of the upper centering ring with the central body until a connection between the central body and the reduction cone, wherein said head, said upper centering ring and said central body internal diameters are substantially equal.

2. The variable pressure device to solubilize carbon dioxide in a beverage, according to claim 1 to solubilize carbon dioxide in a beverage, further comprising:

a carbon dioxide inlet valve disposed at the top part of said carbonation tank and configured to add the carbon dioxide in the carbonation tank, a carbon dioxide diversion valve connected to said carbonation tank and configured to add carbon dioxide in the Venturi, wherein, said modulating valve is disposed after said carbon dioxide diversion valve.

3. The variable pressure device to solubilize carbon dioxide in a beverage according to claim 2, further comprising a beverage inlet valve configured to add beverage in said carbonation tank, the beverage inlet valve disposed after the Venturi (V).

4. The variable pressure device to solubilize carbon dioxide in a beverage according to claim 3, wherein said carbonation ring establishes a section reduction in the area of the Venturi.

5. The variable pressure device to solubilize carbon dioxide in a beverage according to claim 4, wherein the internal diameter of said reduction cone varies from an internal diameter substantially equal to the central body internal diameter until the internal diameter of said reduction cone reaches a supplementary internal diameter of a centering pillow.

6. The variable pressure device to solubilize carbon dioxide in a beverage according to claim 5, wherein the device further comprises a recycling inlet configured to reintroduce the beverage in said carbonation tank, said recycling inlet working in a shower mode.

7. The variable pressure device to solubilize carbon dioxide in a beverage according to claim 3, wherein said beverage inlet valve is disposed at 30% of the carbonation tank's level.

8. The variable pressure device to solubilize carbon dioxide in a beverage according to claim 7, further comprising a venting valve attached to the top part of said carbonation tank and a discharge valve attached to the bottom part of said carbonation tank, and wherein a booster pump is arranged immediately after said discharge valve.

9. The variable pressure device to solubilize carbon dioxide in a beverage according to claim 8, wherein a recycling valve is arranged after said booster pump, the device further comprises an outlet located between said booster pump and said recycling valve and a level sensor arranged on the lid of said tank.

10. The variable pressure device to solubilize carbon dioxide in a beverage according to claim 9, wherein the discharge valve has an associated vibrating fork.

11. The variable pressure device to solubilize carbon dioxide in a beverage according to claim 10, wherein said beverage is water or a syrup.

12. The variable pressure device to solubilize carbon dioxide in a beverage according to claim 11, wherein the beverage being fed into said Venturi is previously passed through a heat exchanger.

13. The variable pressure device to solubilize carbon dioxide in a beverage according to claim 12, wherein said level sensor is a capacitive type sensor.

14. The variable pressure device to solubilize carbon dioxide in a beverage according to claim 13, wherein said upper outer body and said lower outer body have internal diameters that are substantially identical to achieve beverage flow continuity.

15. The variable pressure device to solubilize carbon dioxide in a beverage according to claim 14, wherein said carbonation tank is made of a stainless steel sheet 5 mm thick, said sheet being rolled to a cylinder, joined by inert welding on outer and inner faces where caps are welded, one cap at a top portion thereof and another cap at a bottom portion thereof, the top cap includes an inspection opening provided with a flange on which a pipe is welded for venting purposes, said pipe being associated with the venting valve, and a collar is associated for said level sensor, a carbon dioxide inlet pipe, which is associated to said carbon dioxide inlet valve, a second flange for a safety valve, an additional pipe communicating to said recycling valve with said recycling inlet, and a second collar to a pressure transducer, and said bottom cap includes the discharge valve to discharge beverage from said carbonation tank.

16. The variable pressure device to solubilize carbon dioxide in a beverage according to claim 15, wherein said upper outer body is comprised of a first upper flange, the central body welded on one end to said first upper flange and on the other, to the carbonating ring which is laterally machined a groove through which carbon dioxide enters, including at the same time, an inlet and fixing means through which said upper outer body is fixed to a carbon dioxide inlet pipeline and to said lower outer body.

17. The variable pressure device to solubilize carbon dioxide in a beverage according to claim 16, wherein said upper outer body, said lower outer body and said bullet are made of stainless steel and said fixing means are screws.

18. The variable pressure device to solubilize carbon dioxide in a beverage according to claim 17, wherein said lower outer body is comprised of a second upper flange through which said upper outer body is linked in a linking region, the lower outer body further comprises a lower flange, both the second upper flange and the lower flange welded to a pipe forming a primary body, a fixing star being arranged at the lower part of said lower outer body, in the center of which there is a threaded opening and a centering pillow, and which arms are welded to an internal part of the pipe internal part, a center of the star is concentric to a wall of pipe.

19. The variable pressure device to solubilize carbon dioxide in a beverage according to claim 18, wherein said bullet's head comprises a dome shaped form, in which the center of the head has a first through hole which crosses the head lengthways, and in the head's bottom part the head has an overhand rebate which allows to abut into the upper centering ring wherein the upper centering ring is machined with an upper rebate, a lower rebate and a second through hole which crosses the upper centering ring lengthways, said upper centering ring has at least four periphery holes distributed at 90° where at least four nipples are nailed to fix said bullet to said pipeline in the linking region of said upper outer body with said lower outer body, the central body of cylindrical shape immediately after said upper centering ring which is subjected to upper and lower recessing in upper and lower portions of the central body respectively, in order to allow abutment with said upper centering ring and with the reduction cone, where said central body further includes a third through hole which crosses the central body lengthways, said reduction cone is turned to generate: a cone, an upper recessing to be linked to said central body, a lower recessing to be linked to said fixing star of said lower outer body by means of said centering pillow, and said reduction cone further includes a fourth through hole which crosses the reduction cone lengthways.

20. The variable pressure device to solubilize carbon dioxide in a beverage according to claim 19, wherein a coupling rod crosses said first, second, third and fourth through holes and has a supplementary thread to that of said threaded opening to fix said bullet to the pipeline.

21. The variable pressure device to solubilize carbon dioxide in a beverage according to claim 20, wherein said head, said upper centering ring and said central body have external diameters, which must be defined in order to reduce said pipeline area so as to generate the Venturi effect, allowing the beverage stream lines to pass.

22. The variable pressure device to solubilize carbon dioxide in a beverage according to claim 21, further comprising a control point arranged between said modulating valve and said Venturi, said control point being attached to a programmable logic controller.

23. The variable pressure device to solubilize carbon dioxide in a beverage according to claim 22, wherein said outlet is connected to a filling equipment.

24. The variable pressure device to solubilize carbon dioxide in a beverage according to claim 23, wherein said modulating valve is a retention valve.

* * * * *